United States Patent
Allen et al.

(10) Patent No.: US 7,325,820 B2
(45) Date of Patent: Feb. 5, 2008

(54) INDEPENDENT REAR SUSPENSION

(75) Inventors: Steve Allen, Saline, MI (US); Tony Adamo, Dearborn, MI (US); Peter Jargowsky, Canton, MI (US); Chris Allard, Canton, MI (US); Brian Miller, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 372 days.

(21) Appl. No.: 11/160,807

(22) Filed: Jul. 11, 2005

(65) Prior Publication Data

US 2007/0007742 A1    Jan. 11, 2007

(51) Int. Cl.
*B60G 3/00*    (2006.01)

(52) U.S. Cl. .................. 280/124.15; 280/124.128; 280/124.145; 280/124.135; 280/124.109; 280/124.134; 280/124.152; 280/124.125; 280/124.138; 280/124.139; 280/124.137

(58) Field of Classification Search ......... 280/124.128, 280/124.153, 124.135, 124.134, 124.109, 280/124.125, 124.138, 124.136, 124.137, 280/124.141, 124.139, 124.143, 124.145, 280/124.152, 124.15, 124.09
See application file for complete search history.

(56) References Cited

U.S. PATENT DOCUMENTS

| | | | |
|---|---|---|---|
| 3,193,302 A * | 7/1965 | Hill ..................... | 280/124.128 |
| 4,474,389 A | 10/1984 | von der Ohe | |
| 4,671,531 A * | 6/1987 | Sautter et al. ........ | 280/124.109 |
| 4,740,011 A | 4/1988 | Mitobe et al. | |
| 4,815,755 A * | 3/1989 | Takata et al. ......... | 280/124.128 |
| 4,957,308 A | 9/1990 | Takizawa | |
| 5,005,857 A | 4/1991 | Camuffo | |
| 5,176,398 A | 1/1993 | Kanai et al. | |
| 5,513,874 A | 5/1996 | Mori | |
| 5,851,016 A | 12/1998 | Kawagoe et al. | |
| 6,019,383 A | 2/2000 | Kociba et al. | |
| 6,109,631 A | 8/2000 | Jones et al. | |
| 6,241,267 B1 | 6/2001 | Dziadosz et al. | |
| 6,869,090 B2 | 3/2005 | Tatsumi et al. | |
| 6,945,547 B2 * | 9/2005 | Ackley et al. ........ | 280/124.143 |
| 2005/0140112 A1 * | 6/2005 | Kim .................... | 280/124.143 |

FOREIGN PATENT DOCUMENTS

| | | | |
|---|---|---|---|
| DE | 10014878 | * | 9/2001 |
| EP | 0 302 226 B1 | | 11/1993 |
| EP | 1145877 | | 10/2001 |
| GB | 2 147 553 A | | 5/1985 |

* cited by examiner

*Primary Examiner*—Joe H. Cheng
*Assistant Examiner*—Nicole Verley
(74) *Attorney, Agent, or Firm*—Frederick Owens; Brooks Kushman P.C.

(57) ABSTRACT

An independent rear suspension system is provided that has a trailing arm connected between a frame rail and a wheel support knuckle. A lower control arm is connected between a frame cross member and the knuckle. The suspension system also includes an upper link that extends between the frame rail and the knuckle. The toe link and upper link are generally vertically aligned. A stabilizer bar extends between the toe link and upper link and is connected to the lower control arm outboard of the shock and spring to reduce space requirements for the suspension system forward of the wheel support knuckle. The lower control arm is elongated and attached to the frame cross member inboard of the frame rails to improve the ratio of wheel travel to shock travel.

20 Claims, 5 Drawing Sheets

INDEPENDENT REAR SUSPENSION

BACKGROUND OF THE INVENTION

1. Field of the Invention

The present invention relates to an independent rear suspension for a vehicle, such as a sport utility vehicle having a third row of seats.

2. Background Art

Independent rear wheel suspension systems generally are comprised of shock absorbers, springs and links between the frame of the vehicle and a wheel support knuckle. Upper and lower links, or control arms, generally form an articulated link that allows the vehicle to move vertically relative to the wheel. The shock absorbers and springs are generally provided to absorb impacts to the wheel and provide a smooth ride. Adjustable camber links and toe links are provided to permit adjustment of the wheel position. A stabilizer bar is generally provided to equalize forces laterally by coupling transversely aligned independent suspensions.

Suspension systems are designed to provide the desired ride and handling characteristics for a vehicle. Sports cars are generally provided with tight suspensions to improve handling. Luxury cars are provided with suspensions that are tuned to provide a softer ride with somewhat reduced handling performance. When designing or tuning a suspension system, fore and aft connections between the frame and the wheel support can be provided with softer elastomeric bushing connections to provide a softer ride. Transverse connections between the frame and the wheel support can be provided with more rigid elastomeric bushings to provide improved handling characteristics.

One rating of a vehicle suspension system is the shock ratio which is defined as the ratio of wheel travel to shock travel. A shock ratio of greater than 1.3:1 results in higher loads being applied to the frame from the shock and spring. Lower loads translate into a more comfortable ride. The length of lower control arms on full frame vehicles are limited generally to the distance between the frame rails and the wheel support knuckle. As the length of the lower control arm is reduced, the shock ratio of the suspension system increases.

The length of the lower control arm also impacts the efficiency of the stabilizer bar ratio. Stabilizer bar ratio efficiency improvements can result in the reduction of the cost and weight of the stabilizer bar.

Shock and spring location in independent rear suspensions can result in a reduction of space available for third row passenger's feet. If the shock and spring are located near the third row passenger's feet, a higher floor may be required in front of the third row seats.

The angular orientation of suspension links such as the lower control arm and toe link can impact toe-in during braking and throttle off conditions. Increasing toe-in of vehicle wheels is preferred during such conditions. Divergent toe links and lower control arms that may be required due to space limitations can reduce toe-in during braking and throttle off conditions.

Adjusting the wheel position toe-in and camber in prior art suspension systems generally must be performed in an iterative manner because, for example, in some suspension systems adjusting toe-in can cause the wheel camber to change, and visa versa. The camber must then be adjusted, which can affect the toe-in adjustment. This problem is referred to as confounding and occurs when either camber or toe-in are adjusted.

Suspension systems require adequate clearance for movement of the wheel and the suspension components relative to the vehicle frame and body. The location of suspension components can impact the design of the vehicle compartment floor pan. Suspension system components must be contained within the envelope defined below the floor pan and frame. Suspension components located forward of a seat located above the rear axle of a vehicle can result in a reduction of foot well space available in front of the seat.

It is desirable to address the above design challenges with a compact rear suspension system that provides desirable axle, suspension system and wheel clearance while affording ample space for a third row seat and foot well space. It is also desirable to provide such a suspension system that reduces confounding between toe-in and camber adjustments. The above problems and others are addressed by applicants' invention as summarized below.

SUMMARY OF THE INVENTION

According to the present invention, an independent rear suspension for a vehicle having a body that may be mounted on full frame rails is provided. A cross member is secured between the frame rails. The suspension system has a wheel support that includes a knuckle that is aligned with an axle axis. A trailing arm extends from a point on the frame rail forward of the axle axis to the wheel support knuckle. An upper link extends from a point on the frame rail above and forward of the axle axis to the wheel support knuckle. A lower control arm is attached to the cross member inboard of the frame rails and is also connected to the wheel support knuckle. A toe link bar is attached to the frame rail below and forward of the axle axis and extends between the frame rail and the knuckle. A stabilizer bar is connected to the lower control arm by a connecting link and is connected on the opposite side of the vehicle to the suspension system of a wheel disposed and located on the opposite side. A spring is secured to the shock absorber that is secured between the lower control arm and the frame.

According to one aspect of the invention, the stabilizer bar may pass between the toe link bar and the upper link. The stabilizer bar is connected on its ends to the lower control arms by stabilizer bar connecting links.

According to another aspect of the invention, the lower control arm may be more than twice as long as the toe link. A shock ratio may be provided of less than or equal to 1.3:1 (wheel travel/shock travel).

According to another aspect of the invention, the lower control arm may be attached to the wheel support knuckle forward of the location where the lower control arm is attached to the cross member. In addition, the upper link may be attached to the knuckle above and forward of the wheel axis.

According to other aspects of the invention that may be applicable to one or more of the above embodiments, the toe link may have a toe-in adjustment mechanism that allows the wheel toe-in to be adjusted. Alternatively, the lower control arm may have a toe-in adjustment mechanism that reduces confounding. The upper link may have a camber adjustment mechanism that allows the wheel camber to be adjusted. Camber adjustment and toe-in adjustment may be performed independently without substantially confounding the other adjustment. The toe-in adjustment mechanism is located on the lower control arm and adjusts the toe-in about an axis defined by the upper link and the toe link attachment points to the knuckle. The camber adjustment mechanism is located on the upper link and adjusts the camber about an axis defined by the lower control arm and the toe link attachment points to the knuckle.

According to another aspect of the invention, the toe link may be attached to the frame rail forward of the upper link to provide added clearance relative to the floor pan of the vehicle for the upper link. The upper link is preferably disposed above the toe link within 12° of a vertical line extending upwardly from the toe link connection to the knuckle.

The independent rear suspension may have a shock absorber and spring that are concentrically disposed and located directly below a third row seat cushion. The stabilizer bar may be connected to the lower control arm between the knuckle and the spring. In addition, the lower control arm may be more than twice as long as the toe link to allow for a shock ratio of less than 1.3:1. The lower control arm, trailing arm, and upper link may each be connected to the wheel support knuckle. The lower control arm may be attached to the wheel support knuckle forward of the location where the lower control arm is attached to the cross member.

One advantage that may be achieved by the invention, as summarized above, is that the foot well for a third row passenger seat may be enlarged due to less space being required forward of the axle for the suspension system components. Another advantage that may be achieved is that an independent rear suspension may be provided that may be readily tuned to provide desired ride and handling characteristics. Yet another advantage of the invention is that camber and toe-in adjustments may be performed with reduced confounding resulting from adjustment of either the camber or toe-in adjustment mechanisms.

In addition to the above advantages, other advantages are provided and other problems may be solved by applicants' invention as will be better understood in view of the attached drawings and following detailed description of the illustrated embodiment of the invention.

DETAILED DESCRIPTION OF THE PREFERRED EMBODIMENT(S)

Figure 1:
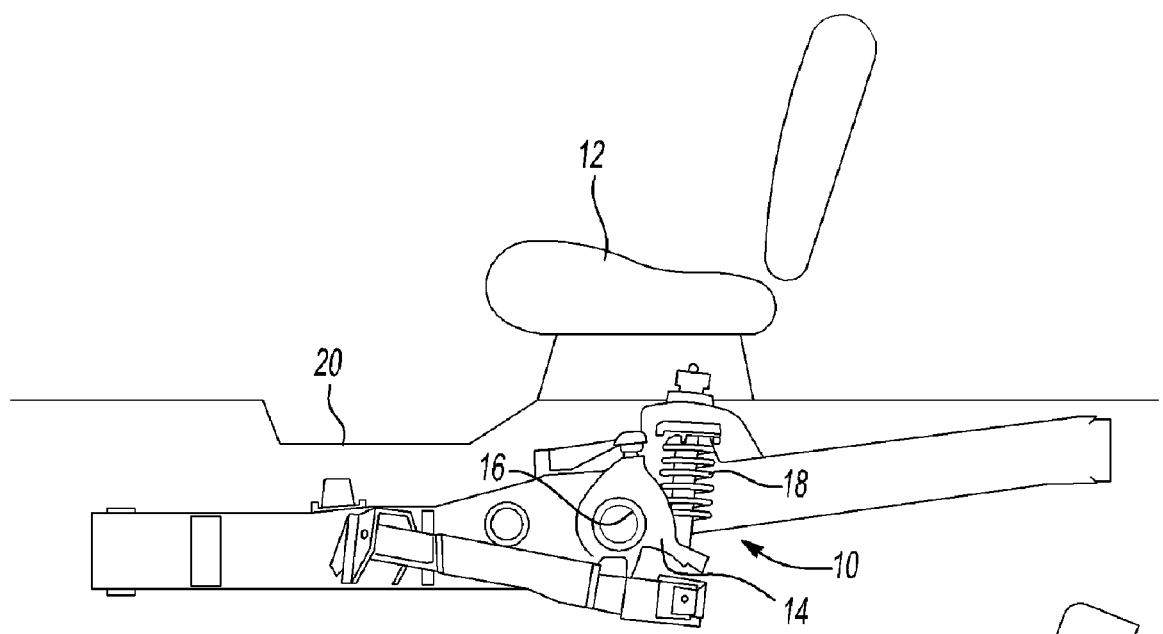
FIG. 1 is a diagrammatic side elevation view of a prior art independent rear suspension and third row seat.

Referring to FIG. 1, a diagrammatic representation of a prior art independent rear suspension system 10, similar to that disclosed in U.S. Pat. No. 6,109,631, is provided. The suspension system 10 is located below the third row seat 12 of a sport utility vehicle. A wheel support knuckle 14 defines an axle bore 16 through which a rear axle of the vehicle extends. The axle is supported by a combined shock and spring assembly 18 and is disposed rearward of the axle bore 16 and below the rear portion of the third row seat 12 that is secured to the vehicle floor pan 20. The tow link (not shown) is located rearward of the axle center.

Figure 2:
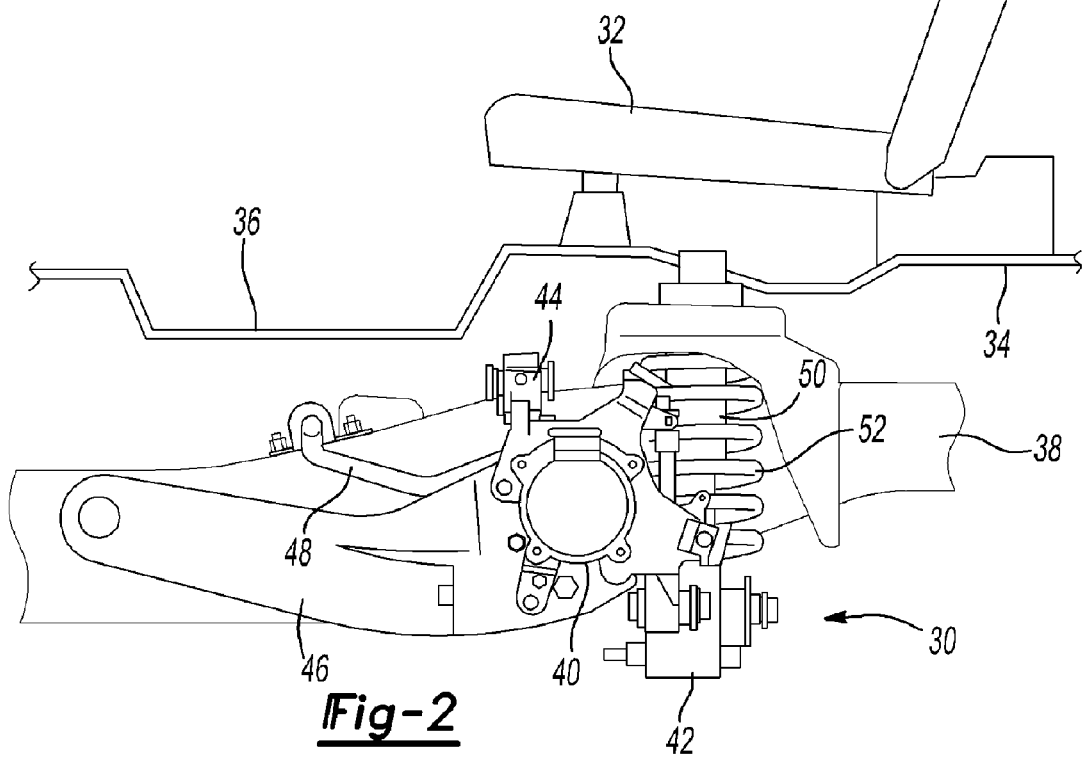
FIG. 2 is a diagrammatic side elevation view of a third row seat and independent rear suspension made in accordance with one embodiment of the present invention.

Referring to FIG. 2, an independent rear suspension system 30 made according to one embodiment of the present invention is shown. The suspension system 30 is located below the third row seat 32 of a sport utility vehicle. A floor pan 34 of the vehicle defines a foot well 36 forward of the third row seat 32. The vehicle is supported by the suspension system 30 on a frame rail 38 to which the floor pan 34 is secured. A wheel support knuckle 40 is connected to the frame of the vehicle by a lower control arm 42, an upper link 44, and trailing arm 46. The trailing arm 46 is connected to the frame rail 38, the knuckle 40 and a toe link that is not shown in FIG. 2, but is illustrated in FIGS. 3-6. A stabilizer bar 48 may form part of the suspension system 30 that equalizes forces applied to one rear wheel of a vehicle relative to the suspension system 30 to a rear wheel located on the opposite transverse side of the vehicle. Suspension system 30 also includes a shock absorber 50 and a spring 52. The shock absorber 50 is connected between the lower control arm 42 and the frame rail 38. Spring 52 is connected between the frame rail 38 and the shock absorber 50.

Figure 3:
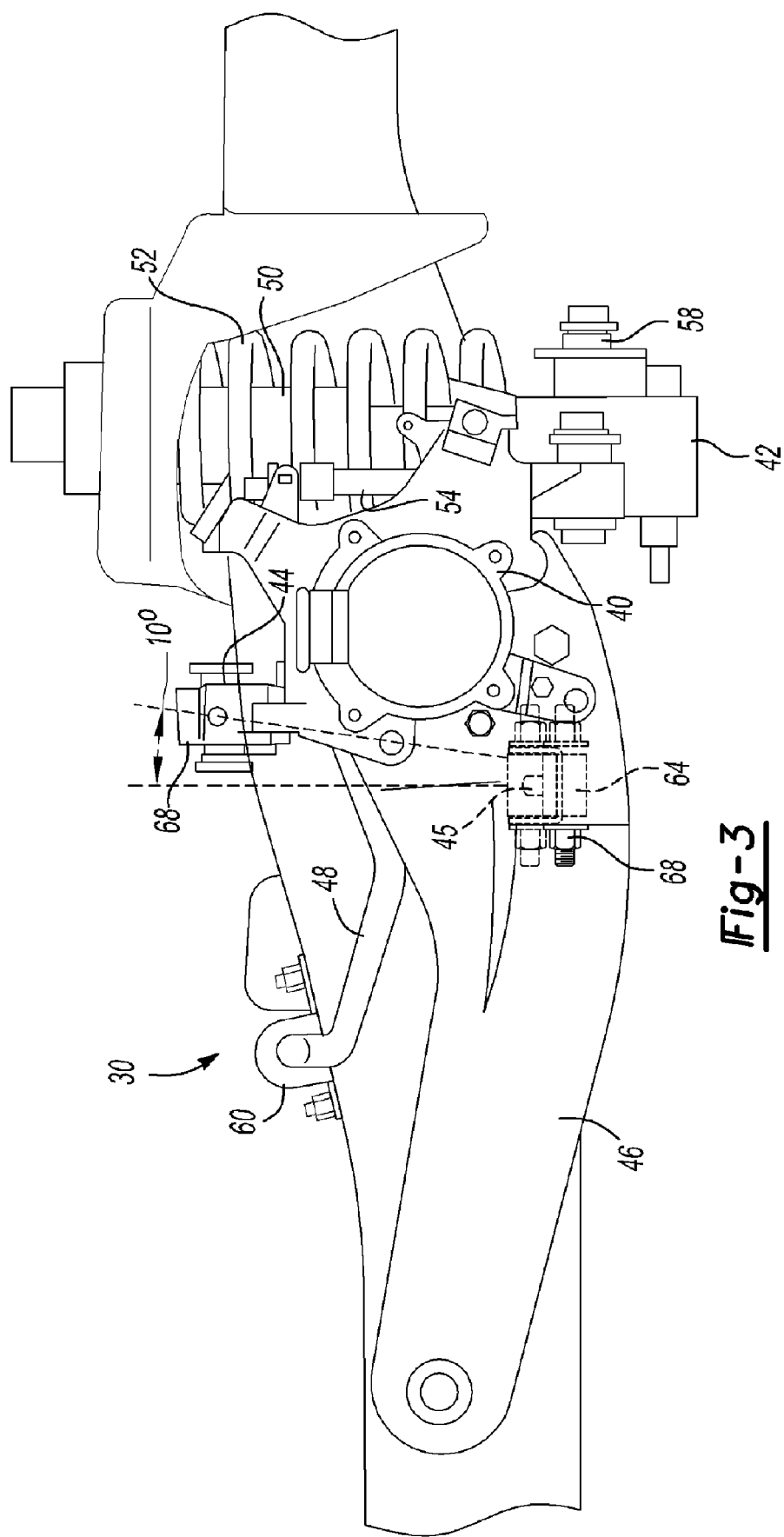
FIG. 3 is a side elevation view of the independent rear suspension shown in FIG. 2.
Figure 4:
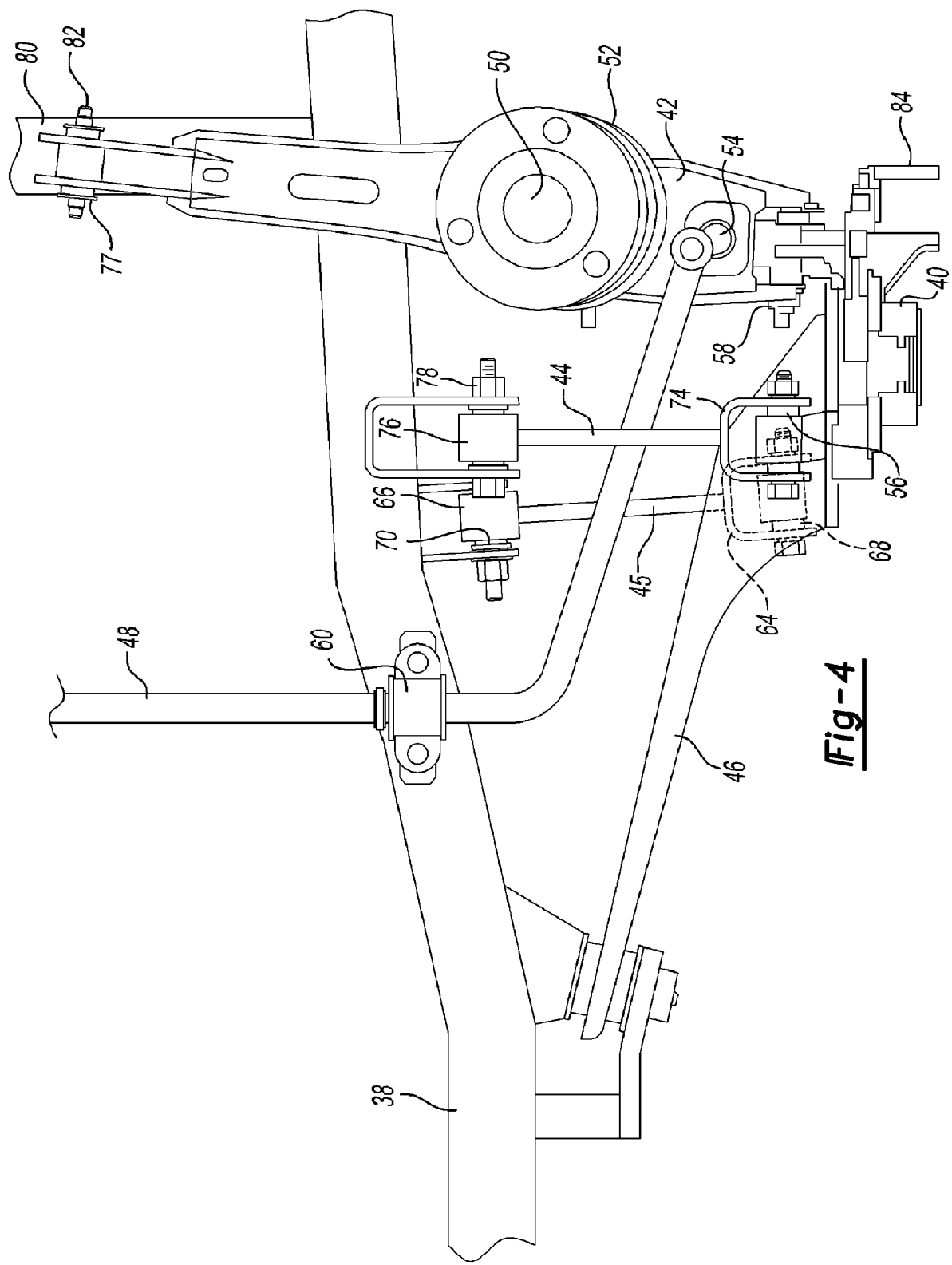
FIG. 4 is a top plan view of the independent rear suspension shown in FIG. 2.

Referring to FIGS. 3 and 4, a stabilizer bar connecting pin 54 connects one end of the stabilizer bar 48 to the lower control arm 42. An upper link bushing 56 is provided between the upper link 44 and the knuckle 40. The upper link bushing 56 is an elastomeric member. Outer lower control arm bushing assembly 58 is provided between the lower control arm 42 and the knuckle 40. The bushings 56 and 58 provide a resilient connection between the upper link 44, lower control arm 42 and the wheel support knuckle 40. It should be understood that attachments of the upper link 44 and lower control arm 42 to the knuckle 40 can be with either bushings or ball joints. A stabilizer bar bracket and bushing 60 are secured to the stabilizer bar 48 and the frame rail 38.

A toe link 45 connects the trailing arm 46 to the frame rail 38. Toe link 45 includes an outer clevis end 64 and an inner tubular end 66. The outer clevis end 64 could alternatively be a tubular end. An outer end bushing 68 is secured within the outer clevis end 64 and an inner end bushing 70 is provided in the inner tubular end 66. The upper link 44 has an outer clevis end 74 and an inner tubular end 76.

Figure 5:
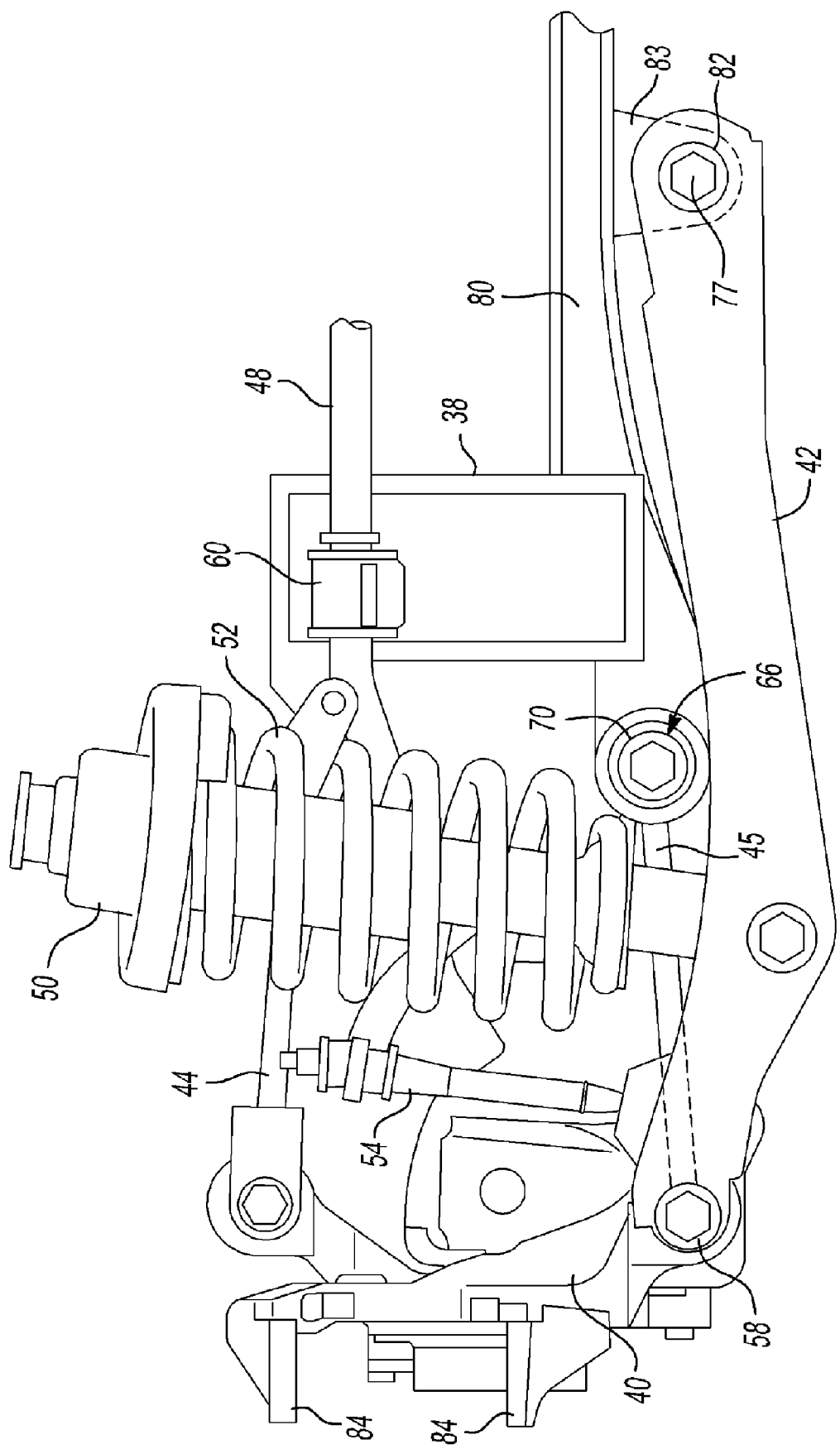
FIG. 5 is a rear elevation view of the independent rear suspension shown in FIG. 2.

Referring to FIGS. 4 and 5, the suspension system 30 is shown in conjunction with cross member 80. Cross member 80 extends between the frame rails 38 that extend longitudinally relative to the vehicle and are provided adjacent right and left sides of the vehicle.

An inner lower control arm bushing assembly 82 connects the inner end of lower control arm 42 to a frame bracket 83. The lower control arm 42 extends from the inner bushing assembly 82 to the knuckle 40. The length of the lower control arm 42, as measured from the wheel knuckle 40 to the inner bushing assembly 82, is more than twice the length of the toe link 45. The increased length of the lower control arm 42 provides a shock ratio of less than or equal to 1.3:1 of wheel travel to shock travel. For example, movement of the wheel support knuckle of 2.6" is translated into 2" of shock movement. As a result, increased damping is obtained at the shock absorber 50 due to the effect of the lever corresponding to the lower control arm.

By comparison, the wheel travel to shock travel ratio of the attachment point to the lower control arm in U.S. Pat. No. 6,109,631 is 1.33:1. As a result, improved shock absorber performance is obtained. The lower control arm 42 of the present invention is longer but less massive than the lower control arm in the '631 patent resulting in weight reduction of the suspension system that may contribute to added fuel efficiency improvements.

The lower control arm 42 cooperates with the trailing arm 46. Trailing arm 46 is connected to the frame rail 38 on its forward end and the wheel support knuckle 40 on its rearward end. The trailing arm 46 is also connected by the toe link 45 to the frame rail 38. In addition, the upper link 44 is secured between the frame rail 38 and the wheel support knuckle 40. Upper link 44 may also be referred to as a camber link. The frame bracket 83 of the lower control arm is mounted to the cross member 80 at a location that is further inboard than the bracket that secures the lower control arm to the frame rail as disclosed in the '631 patent.

The upper link 44 extends slightly rearwardly from its connection point to the frame rail 38 to the knuckle 40. Conversely, the lower control arm extends forwardly from frame bracket 83 on the cross member 80 to the knuckle 40. This arrangement may provide improved braking toe-in.

Stabilizer bar 48 is connected to the lower control arm 42 by the stabilizer bar connecting pin 54 outboard of the shock 50 and spring 52 and inboard of the knuckle 40. This spacial relationship improves the efficiency of the stabilizer bar 48 that functions as a torsion spring. The stabilizer bar 48 is more efficient in that it has reduced cost and weight. The stabilizer bar 48 extends between the toe link 45 and the upper link 44. By routing the stabilizer bar below the upper link 44 and above the toe link 45, less vertical space is required between the suspension system 30 and the compartment pan 34. In particular, the foot well 36 may be increased in size affording third row passengers more room for their feet within the foot well 36.

The toe link 45 is secured substantially vertically below the upper link 44. The upper link 44 is secured to the knuckle less than 12° rearward of the connection point for the toe link 45, which should be understood as being substantially vertically aligned. Adjustments of toe-in with an adjustment mechanism 77 (such as an elliptical washer or slot that receives a locking fastener) on the lower control arm do not confound the camber adjustment because the outer clevis end 64 of the toe link 45 and the outer clevis end 74 of the upper link 44 are substantially vertically aligned. That is, if the toe-in of the wheel is adjusted at the lower control arm, it is not normally required to also adjust the camber unless the wheel was previously out of adjustment as to camber. By horizontally aligning (within 12° of horizontal) the lower control arm 42 and the toe link 45, adjusting camber with a camber adjustment mechanism 78 (such as an elliptical washer or slot that receives a locking fastener) on the upper link 44 does not adversely effect toe-in adjustment. This simplifies adjusting the wheel position by allowing for adjustments to camber or toe-in independently without requiring compensatory adjustments.

The orientation of the lower control arm 42, upper link 44 and toe link 45 at only slight angles relative to a transverse direction provides the ability to improve vehicle handling since the bushings for these links may provide a stiffer connection between the upper links 44, toe link 45, and the lower control arm 42 relative to the frame rail 38 and knuckle 40. By providing stiffer lateral load bushings, handling can be improved without substantially reducing ride quality. The longitudinal orientation of the trailing arm 46 permits softer bushings to be provided between the trailing arm and the frame. By providing softer longitudinal load bushings for the trailing arm, a softer ride may be provided without adversely affecting vehicle handling.

Figure 6:
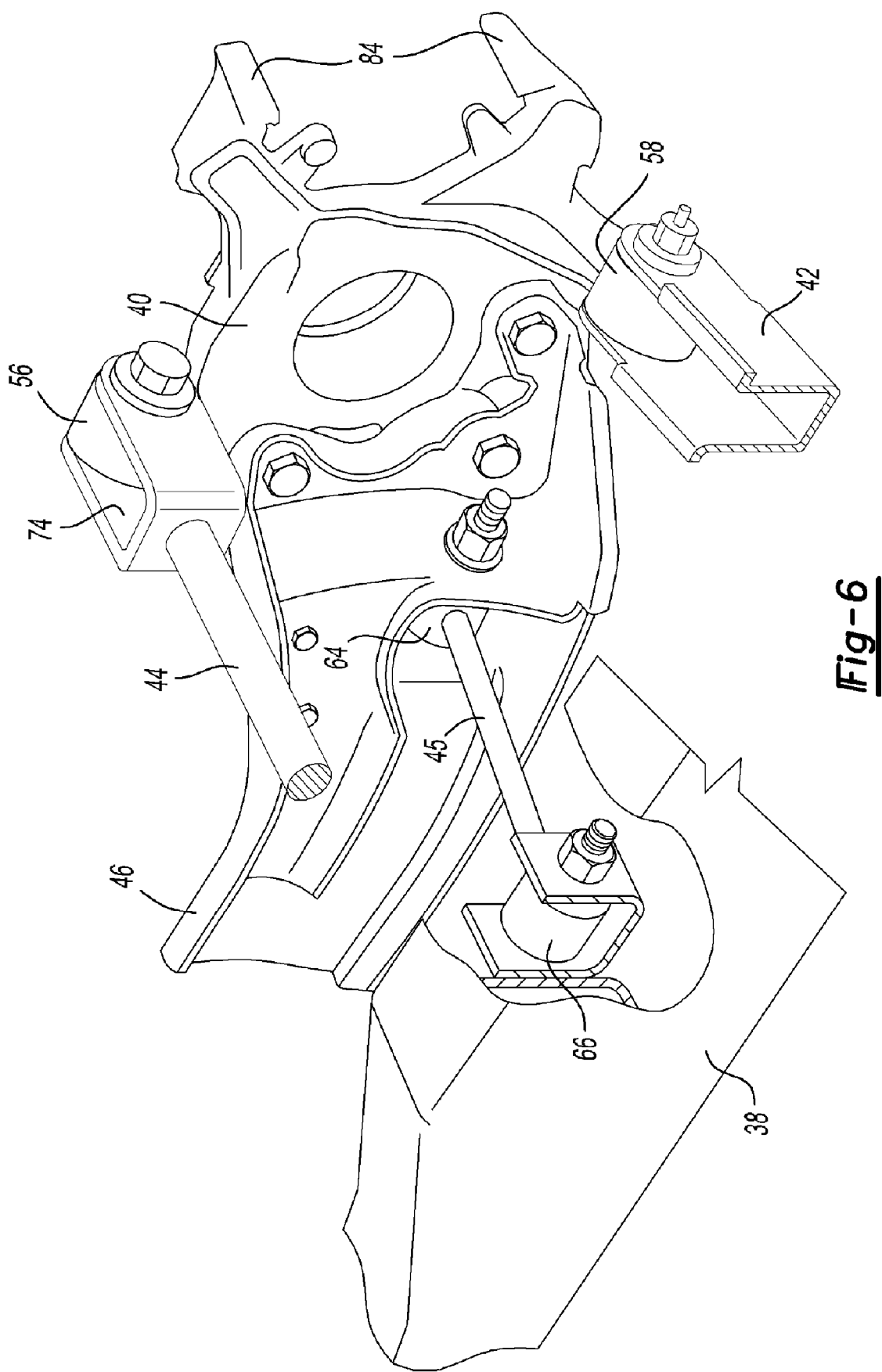
FIG. 6 is a fragmentary rear/inside perspective view of the independent rear suspension shown in FIG. 2.

Referring to FIG. 6, the location of the principle connection points between the frame of the vehicle and the knuckle 40 are shown in greater detail. The knuckle 40 is fixedly secured to trailing arm 46. The lower control arm 42 is connected at outer bushing 58 to the knuckle 40 at a point that is below and rearward of the axle axis. The lower control arm 42 is connected by an inner lower control arm bushing 82 to cross member 80 by the frame bracket 83. Toe link 45 is connected on the outer end to the trailing arm 38 at the outer tubular or clevis end 64 of the toe link 45. The inner tubular end 66 of the toe link 45 is secured to frame rail 38. The toe link 45 is connected to the trailing arm 46 below and forward of the axle axis. Upper link 44 is connected on its outer clevis end 74 through a bushing 56 to the knuckle 40. Track 84 is provided for a brake caliper. The track 84 is integrally formed as part of the knuckle 40 when the knuckle 40 is formed in a casting operation.

While the best mode for carrying out the invention has been described in detail, those familiar with the art to which this invention relates will recognize various alternative designs and embodiments for practicing the invention as defined by the following claims.

What is claimed is:

1. An independent rear suspension for a vehicle having a body, at least two full frame rails, and at least one cross member secured to the two frame rails, the suspension comprising:
   a wheel support including a knuckle that is aligned with an axle axis;
   a trailing arm extending from a point on the frame rail forward of the axle axis to the wheel support knuckle;
   an upper link extending from a point on the frame rail above and forward of the axle axis to the wheel support knuckle;
   a lower control arm extending from one of the cross members to the knuckle, the lower control arm being attached to the cross member inboard of the frame rails;
   a toe link attached to the frame rail below the axle axis and extending between the frame rail and the trailing arm;
   a stabilizer bar connected to the lower control arm by a stabilizer bar connecting link and to the suspension system of a wheel disposed on the opposite side of the vehicle, the stabilizer bar extending between the toe link and the upper link;
   a shock absorber secured to the lower control arm and the frame; and
   a spring secured to the shock absorber and the frame.

2. The independent rear suspension of claim 1 wherein the lower control arm has a toe-in adjustment mechanism that allows the wheel toe-in to be adjusted and the upper link has a camber adjustment mechanism that allows the wheel camber to be adjusted, wherein the camber adjustment and toe-in adjustment may be performed independently without confounding the other adjustment.

3. The independent rear suspension of claim 2 wherein a toe-in adjustment mechanism is located on the lower control arm and the upper link and toe link are substantially vertically aligned.

4. The independent rear suspension of claim 2 wherein the camber adjustment mechanism is located on the upper link and the lower control arm and the upper link are substantially horizontally aligned.

5. The independent rear suspension of claim 1 wherein the toe link is attached to the frame rail forward of the upper link to provide added clearance relative to a floor pan of the vehicle.

6. The independent rear suspension of claim 1 wherein the upper link is disposed above the toe link within 12° of a vertical line extending upwardly from the toe-in link.

7. The independent rear suspension of claim 1 wherein the shock absorber and spring are concentrically disposed and are located directly below a third row rear seat cushion.

8. The independent rear suspension of claim 1 wherein the stabilizer bar is connected to the lower control arm between the knuckle and the spring.

9. The independent rear suspension of claim 1 wherein the lower control arm is more that twice as long as the toe link to allow for a shock ratio (wheel travel/shock travel) of less than or equal to 1.3:1.

10. The independent rear suspension of claim 1 wherein the lower control arm, and the upper link are each attached to the wheel support knuckle by an elastomeric bushing that is received in a bushing receptacle formed on the knuckle.

11. The independent rear suspension of claim 1 wherein the lower control arm is attached to the wheel support knuckle forward of the location where the lower control arm is attached to the cross member.

12. An independent rear suspension for a vehicle having a body, at least two full frame rails, and at least one cross member secured to the two frame rails, the suspension comprising:
   a wheel support including a knuckle that is aligned with an axle axis;
   a trailing arm extending from a point on the frame rail forward of the axle axis to the wheel support knuckle;
   an upper link extending from a point on the frame rail above the axle axis to the wheel support knuckle;
   a toe link attached to the frame rail below the axle axis and extending between the frame rail and the trailing arm;
   a lower control arm extending from one of the cross members to the knuckle, the lower control arm being attached to the cross member inboard of the frame rail nearest the wheel support knuckle to the wheel support knuckle wherein the lower control arm is more that twice as long as the toe link to allow for a shock ratio of less than or equal to 1.3:1;
   a shock absorber secured to the lower control arm and the frame; and
   a spring secured to the shock absorber and the frame.

13. The independent rear suspension of claim 12 wherein the lower control arm has a toe-in adjustment mechanism that allows the wheel toe-in to be adjusted about a vertical axis defined by the upper link and toe link attachment points to the knuckle and the upper link has a camber adjustment mechanism that allows the wheel camber to be adjusted about a horizontal axis defined by the lower control arm and the toe link attachment points to the knuckle, wherein the camber adjustment and toe-in adjustment may be performed independently without confounding the other adjustment.

14. The independent rear suspension of claim 12 wherein the toe link is attached to the frame rail forward of the upper link to provide added clearance relative to a floor pan of the vehicle, and wherein the upper link is disposed above and rearward of the toe link within 12° of a vertical line extending upwardly from the toe-in link.

15. The independent rear suspension of claim 12 wherein the lower control arm is attached to the wheel support knuckle forward of the location where the lower control arm is attached to the cross member.

16. An independent rear suspension for a vehicle having a body, at least two full frame rails, and at least one cross member secured to the two frame rails, the suspension comprising:
   a wheel support including a knuckle that is aligned with an axle axis;
   a trailing arm extending from a point on the frame rail forward of the axle axis to the wheel support knuckle;
   an upper link extending from a point on the frame rail above the axle axis to the wheel support knuckle;
   a lower control arm extending from one of the cross members to the knuckle, the lower control arm being attached to the cross member inboard of the frame rails and to the wheel support knuckle, wherein the lower control arm is attached to the wheel support knuckle forward of the location where the lower control arm is attached to the cross member;
   a toe link attached to the frame rail below the axle axis and extending between the frame rail and the trailing arm;
   a shock absorber secured to the lower control arm and the frame; and
   a spring secured to the shock absorber and the frame.

17. The independent rear suspension of claim 16 wherein the upper link is attached to the knuckle above and forward of the wheel axis and the lower control arm is attached to the knuckle below and rearward of the wheel axis.

18. The independent rear suspension of claim 17 wherein the upper link and lower control arms are secured to the knuckle at diametrically opposed locations relative to the wheel axis.

19. The independent rear suspension of claim 16 wherein the toe link has a toe-in adjustment mechanism that allows the wheel toe-in to be adjusted and the upper link has a camber adjustment mechanism that allows the wheel camber to be adjusted, wherein the camber adjustment may be performed independently without confounding the toe-in adjustment.

20. The independent rear suspension of claim 16 wherein the toe link is attached to the frame rail forward of the upper link to provide added clearance relative to a floor pan of the vehicle, wherein the upper link is disposed rearward and above the toe link within 12° of a vertical line extending upwardly from the toe link.

* * * * *